United States Patent Office 2,806,940
Patented Sept. 17, 1957

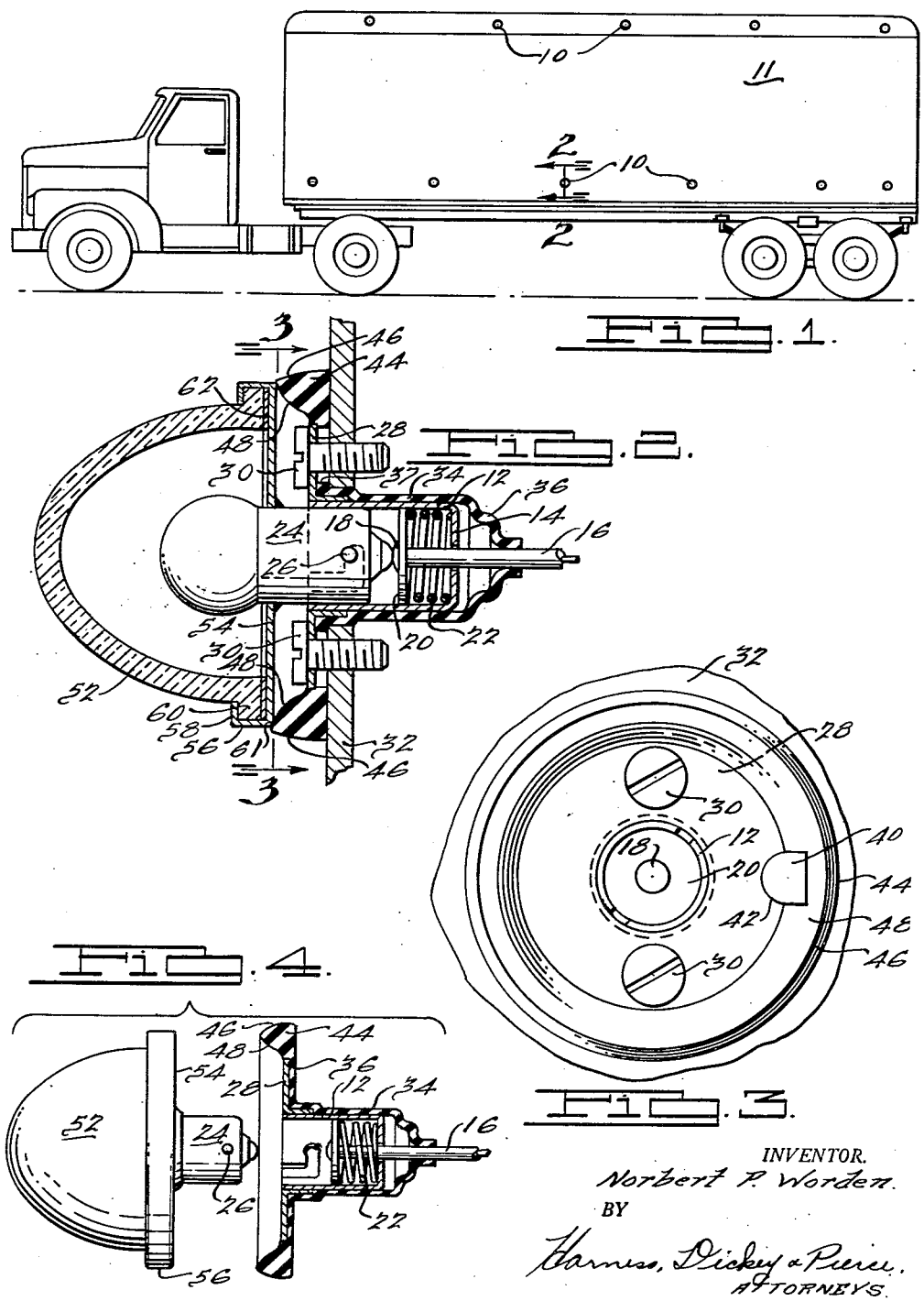

2,806,940

LAMP ASSEMBLY

Norbert P. Worden, Detroit, Mich., assignor to C. M. Hall Lamp Co., Detroit, Mich., a corporation of Michigan Application August 27, 1954, Serial No. 452,588

9 Claims. (Cl. 240—52.1)

This invention relates to lamp assemblies and more particularly to demountable lamp assemblies.

The object of this invention is to simplify, reduce the cost of manufacture, enhance the durability and improve the replaceability of lamp assemblies.

A feature of this invention is a socket assembly which may be relatively permanently affixed to a mounting surface and a lamp assembly which is readily associable with and disassociable from the socket assembly for purposes of replacement.

Another feature of this invention is a mounting pad adapted flexibly to support a lamp assembly in relation to a socket assembly and to the article upon which the socket assembly is mounted.

A further feature of this invention is a mounting pad so conformed as flexibly to support a disc or circular plate and to provide a dust and moisture seal therebetween.

The manner of accomplishing the foregoing object and features and other objects and features will become apparent from a consideration of the following detailed description of one embodiment of the invention when read with reference to the accompanying drawing in which:

Figure 1 is a view of a tractor-trailer combination to which the lamp assembly embodying the principles of this invention may be applied;

Fig. 2 is a sectional view taken substantially along the line 2—2 of one of the lamp assemblies shown in Fig. 1;

Fig. 3 is a view taken substantially along the line 3—3 of Fig. 2 with the lamp assembly removed to show a front elevational view of the socket assembly; and Fig. 4 is a view in partial section showing the lamp assembly and socket assembly separated.

While the lamp assembly embodying the principles of this invention may find application in a variety of fields, it is exemplarily applied to a truck, as is shown in Fig. 1 of the drawing, since in such an application the features of the invention are highly advantageous.

Trucks or tractor-trailer combinations are normally required to install running lights tending to establish the general outlines of the vehicle during night driving. It is usually specified that such lights must appear not only upon the front and back of the truck or trailer but also along the sides thereof, and several such running lights 10 are shown on the side of the trailer 11 in the view of Fig. 1 of the drawing. Since it is usually not feasible to mount the surface of the lamp, or the lens covering the bulb, flush with the surface of the vehicle, and since, further, such flush mounting would provide insufficient indication to meet all the applicable requirements, the majority of such lamp assemblies have a glass or plastic element protruding rearwardly or laterally of the truck or trailer. The casualty rate as to such lamps is exceedingly high due to mishaps during driving and, particularly, during the endeavor to park the truck or trailer adjacent a loading platform.

In lamp assemblies conventionally employed for this purpose, damage to the lens normally requires replacement of the entire assembly or at least requires the unscrewing of several elements thereof to permit replacement of the damaged part.

In lamp assemblies designed according to the principles of the subject invention, replacement of a broken lens and bulb assembly may be accomplished in a matter of seconds and requires no tools in the accomplishment. Further, despite this ready demountability, the lamp unit, when assembled, protects the electrical elements from damage by corrosion, dust, or mechanical shocks to a substantial degree.

One of the lamp assemblies 10 shown in Fig. 1 of the drawings is shown in section in Fig. 2. The lamp assembly comprises a circular cylindrical socket 12 terminating in an end plate 14 which is centrally apertured to permit the passage therethrough of an insulated conductor 16. The insulated conductor 16 terminates in a metallic contact 18 engaging a disc 20 of a suitable insulating material such as fiber. The disc 20 is circular and of a diameter only sufficiently less than the inner diameter of the socket 12 to permit longitudinal motion of the disc 20 therein. The disc 20 is biased away from the end plate 14 by means of a spring 22 so that the contact 18 is forced into intimate electrical engagement with the center contact of the lamp or bulb 24. The socket 12 is suitably apertured at two points along its periphery to accept the bayonet pins 26 of the bayonet-based lamp 24, although it is contemplated that the socket 12 may be internally threaded to accept a screw-type bulb. By connecting the socket 12 to the chassis or to a second conductor, an electrical circuit may be completed through the lamp 24 to the source of electrical power in the vehicle.

Soldered, welded, or otherwise rendered integral with the socket 12 is a circular plate 28 which extends perpendicularly to the longitudinal axis and is affixed to the foremost edge thereof. The configuration of the circular socket plate 28 may also be seen in Fig. 3 of the drawings. This plate 28 is provided with a pair of diametrically opposed apertures to accept the screws 30 by means of which the socket plate 28 is attached to the mounting plate 32, which may be a separate mounting member or may be a portion of the body of the truck or trailer with which the disclosed lamp assembly is associated.

A mounting pad 34 of rubber or other suitable resilient plastic material is provided to perform the functions of resiliently mounting the socket assembly to the vehicle body, of sealing the socket assembly against moisture and dust, and of resiliently mounting the lamp assembly to the socket assembly.

This mounting pad 34 comprises a boot portion 36 surrounding the socket 12 and terminating in an aperture sufficiently small so as tightly to engage the insulation on the conductor 16 to provide a dust and moisture seal at the rear of the assembly.

The mounting pad 34 also comprises a flat annular portion 37 extending parallel with and underlying the circular plate 28. The flat annular portion 37 is provided with a pair of apertures alignable with the apertures in the circular plate 28 so that the screws 30 may pass through both apertures and tap or engage a tapped aperture in the mounting plate 32. As may best be seen in Fig. 3 of the drawings, a boss 40 is formed in the portion 37 of the mounting pad 34 and is provided with a curved surface engaging an aperture 42 perforated at the edge of the circular plate 28. In this fashion, the mounting pad 34, the circular plate 28 and the socket 12 are so oriented relative one to the other that the apertures in the plate 28 and the apertures in the mounting pad 34 are aligned to permit passage of the screws 30 therethrough.

The outer edge of the flat annular portion 37 of the mounting pad 34 terminates in an enlarged peripheral projection 44. The rearmost portion of this annular projection 44 is in plane with the rear surface of the flat annular portion 37 and engages the front surface of the mounting plate 32. The remainder of the enlarged peripheral projection 44 comprises a curved outer surface 46 and a curved inner surface 48 meeting substantially at a point, or at least at a curve of small radius. The nature and functioning of the curved surfaces 46 and 48 will be described hereinafter.

The lamp assembly comprises a bulb 24 positioned within a cavity defined by the curved transparent lens 52 and a metallic plate or disc 54. The disc 54 is provided with a forwardly extending portion 56 and inwardly extending flanges 58 forming a channel accepting a projection 60 extending outwardly around the periphery of the lens 52. The portions 56 and 58 are preferably formed concurrently with the formation of disc 54 from a single sheet of metal by bending or spinning. As a result, the outer corners 61 at the junction of the portions 54 and 56 are curved, although the radius of curvature is preferably quite small.

A tight seal is obtained between the flat disc 54 and the lens 52 by means of the interposition therebetween of a gasket 62. The base of the lamp 24 passes through a central orifice or aperture in the plate or disc 54 and is soldered or otherwise rendered integral therewith.

When the lamp assembly is placed in position in the socket assembly with the bayonet pins 26 of the bulb 24 engaging the apertures in the socket 12, the outer edge of the disc 54 is tightly forced against the surface 48 of the enlarged peripheral projection 44. A tight seal between those elements is obtained through deformation of the plastic material of which the element 44 is made. While projection 44 will operate satisfactorily if it terminates in a flat annular surface engaging the rear surface of the circular disc 54, substantially improved results are obtained through the use of a mounting pad 34 conformed as shown in the drawings.

The inner surface 48 of the projection 44 is provided with a reverse curve so formed as to provide a diminishing angle between the surface of the plate or disc 54 and the tangent to the curve of the surface 48 as that curve approaches the point of juncture between the surface 48 and the surface of the disc 54. The diameter of the outer surface of the portion 56, and hence the outer diameter of the disc 54, is preferably slightly less than the diameter of the circle defined by the forwardmost edge of the enlarged portion 44 so that the disc 54 will engage the surface 48 rather than engaging the edge formed by the boundary between the surfaces 46 and 48. As a result of this arrangement, the disc 54, when forced against the enlarged peripheral projection 44, will engage the surface 48 and tend to deform the peripheral projection 44 outwardly. Advantageously, the portion of the curve 48 which first engages the disc 54 is tangent to the curved edge 61 bounding the disc 54.

To assist in preventing undue distortion and possible damage to the mounting pad 34 due to the continued application of a pressure tending to force the enlarged peripheral projection outwardly from the central axis of the assembly, the outer edge 46 is preferably also curved, with that portion of the surface 46 which is coplanar with the annular portion 37 being of greater diameter than that portion of the curved surface 46 which meets the curved surface 48, i. e., the outer surface of the peripheral projection 44 slopes inwardly from back to front.

The relationship of the socket assembly and lamp assembly prior to complete installation is shown in Fig. 4 of the drawings in which the screws 30 have been omitted so as more clearly to show the relationship between the circular plate 28 and the flat annular portion 37 of the mounting pad 34. With the socket portion affixed to the vehicle, the lamp assembly may be attached thereto by inserting the bayonet base of the lamp 24 into the socket 12. Pressure must be applied adequate not only to compress the spring 22 but also to distort the projection 44 due to the engagement between the inner surface 48 thereof and the disc 54. When fully installed, a moisture and dust proof seal is established such that the electrical elements including the contact 18 and the base of the lamp 24 are protected.

If the truck or trailer approaches a loading platform too closely so that the lens 52 or the entire lamp assembly is damaged, the chances are limited that the socket assembly will also be destroyed since the metallic portions thereof are mounted substantially flush with the sides of the vehicle and since the only extending portion, the projection 44 of the mounting pad 34, is sufficiently flexible to tolerate substantial blows without being damaged. The damaged lamp assembly may be removed and replaced in the manner above described.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a lamp assembly adapted to be secured in an aperture in a mounting plate, a cylindrical lamp socket, a circular plate integral with said socket and lying in a plane perpendicular to the longitudinal axis of said socket, a body portion including a lens, a lamp and a disc, said disc being secured to said lens and to a portion of said lamp to support said lens upon said lamp, a mounting pad comprising a flat annular portion engageable with said circular plate and an enlarged peripheral projection thereon engageable with said disc, and means including said circular plate for fixing said flat annular portion of said pad to the mounting plate, said body portion being retained in position with said disc in abutment with said pad solely by said lamp and said socket.

2. In a lamp assembly, a cylindrical lamp socket, a circular plate integral with said socket and lying in a plane perpendicular to the longitudinal axis of said socket, a body portion including a lens, a lamp and a cricular disc, said disc being secured to said lens and to a portion of said lamp to support said lens upon said lamp, and a mounting pad comprising a flat annular portion engageable with said circular plate and an enlarged peripheral projection thereon, said enlarged peripheral projection having an inner curved surface adjoining an outer surface and engageable with said disc, said body portion being retained in position with said disc in abutment with said pad solely by said lamp and said socket.

3. In a lamp assembly, a cylindrical lamp socket, a circular plate integral with said socket and lying in a plane perpendicular to the longitudinal axis of said socket, a body portion including a lens, a lamp and a circular disc, said disc being secured to said lens and to a portion of said lamp to support said lens upon said lamp and a mounting pad comprising a flat annular portion engageable with said circular plate and an enlarged peripheral projection thereon, said enlarged peripheral projection having a curved surface engageable with said disc, the inner diameter of said curved surface being less than the diameter of said disc and the outer diameter of said curved surface being greater than the diameter of said disc, said body portion being retained in position with said disc in abutment with said pad solely by said lamp and said socket.

4. In a lamp assembly, a cylindrical lamp socket, a circular plate integral with said socket and lying in a plane perpendicular to the longitudinal axis of said socket, a body portion including a lens, a lamp and a circular disc, said disc being secured to said lens and to a portion of said lamp to support said lens upon said lamp, and a mounting pad comprising a flat annular portion engageable with said circular plate and an enlarged peripheral projection thereon extending laterally of the plane of said flat annular portion, said enlarged peripheral projection having a first curved surface engageable with said disc and a second curved surface, the diameter of said second curved surface being greater in the plane of said flat annular portion and lesser out of that plane but the least diameter of said second curved surface being greater than the diameter of said disc, said body portion being retained in position with said disc in abutment with said pad solely by said lamp and said socket.

5. In a lamp assembly, a cylindrical lamp socket, a circular plate integral with said socket and lying in a plane perpendicular to the longitudinal axis of said socket, a body portion including a lens, a lamp and a circular disc, said disc being secured to said lens and to a portion of said lamp to support said lens upon said lamp, a mounting pad comprising a flat annular portion engageable with said circular plate and an enlarged peripheral projection thereon extending laterally of the plane of said flat annular portion, said enlarged peripheral projection having a first curved surface engageable with said disc and a second curved surface, the inner diameter of said first curved surface being less than the diameter of said disc and the outer diameter of said first curved surface being greater than the diameter of said circular disc, the diameter of said second curved surface being greater in the plane of said flat annular portion and lesser out of that plane but the least diameter of said second curved surface being greater than the diameter of said disc, said body portion being retained in position with said disc in abutment with said pad solely by said lamp and said socket.

6. In a lamp assembly, a lamp socket, a circular plate integral with said socket and lying in a plane perpendicular to the longitudinal axis of said socket, a mounting plate, a flexible mounting pad comprising a flat annular portion and an enlarged peripheral projection thereon, means clamping said flat annular portion of said flexible mounting pad between said circular plate and said mounting plate, a body portion including a lens, a lamp and a circular disc, said disc being secured to said lens and to a portion of said lamp to support said lens upon said lamp adapted to lie in spaced parallelism with said circular plate, said enlarged peripheral projection on said mounting pad having a first surface engaging said mounting plate and a second surface engaging said disc, said body portion being retained in position with said disc in abutment with said pad solely by said lamp and said socket.

7. In a lamp assembly, a lamp socket, a circular plate integral with said socket and lying in a plane perpendicular to the longitudinal axis of said socket, a mounting plate, a flexible mounting pad comprising a flat annular portion and an enlarged peripheral projection thereon, means clamping said flat annular portion of said flexible mounting pad between said circular plate and said mounting plate, and a body portion including a lens, a lamp and a circular disc, said disc being secured to said lens and to a portion of said lamp to support said lens upon said lamp adapted to lie in spaced parallelism with said circular plate, said enlarged peripheral projection on said mounting pad having a flat surface engaging said mounting plate, a first curved surface engaging said disc and a second curved surface interjoining said flat surface and said first curved surface, said body portion being retained in position with said disc in abutment with said pad solely by said lamp and said socket.

8. In a lamp assembly adapted to be secured to a vehicle, a centrally apertured disc, a lamp having a base secured to said disc and extending through the aperture in said disc, a lens enclosing a portion of said lamp and secured to said disc, a lamp socket, means for attaching said socket to a vehicle, said lamp base being engageable with said socket, and a mounting pad of resilient material fixed with respect to said socket and engageable with said disc, said body portion being retained in position with said disc in abutment with said pad solely by said lamp and said socket.

9. In a lamp assembly adapted to be secured to a vehicle, a centrally apertured disc, a lamp having a base secured to said disc and extending through the aperture in said disc, a lens enclosing a portion of said lamp and secured to said disc, a lamp socket, means for attaching said socket to a vehicle, said lamp base being engageable with said socket, and a mounting pad of resilient material fixed with respect to said socket and having an enlarged annular peripheral projection thereon engageable with said disc, said body portion being retained in position with said disc in abutment with said pad solely by said lamp and said socket.

References Cited in the file of this patent
UNITED STATES PATENTS

| | | |
|---|---|---|
| 2,069,238 | Fraser | Feb. 2, 1937 |
| 2,076,020 | Fraser | Apr. 6, 1937 |
| 2,208,155 | Daehler | July 16, 1940 |
| 2,263,061 | Allen | Nov. 18, 1941 |
| 2,678,996 | Johnson | May 18, 1954 |